(12) United States Patent
Fink

(10) Patent No.: US 11,680,671 B2
(45) Date of Patent: Jun. 20, 2023

(54) EROSION-RESISTANT INSERTS FOR FLOW EQUIPMENT

(71) Applicant: FMC Technologies, Inc., Houston, TX (US)

(72) Inventor: Daniel R. Fink, Porter, TX (US)

(73) Assignee: FMC Technologies, Inc., Houston, TX (US)

( * ) Notice: Subject to any disclaimer, the term of this patent is extended or adjusted under 35 U.S.C. 154(b) by 570 days.

(21) Appl. No.: 16/489,091

(22) PCT Filed: Jan. 31, 2018

(86) PCT No.: PCT/US2018/016095
§ 371 (c)(1),
(2) Date: Aug. 27, 2019

(87) PCT Pub. No.: WO2018/160310
PCT Pub. Date: Sep. 7, 2018

(65) Prior Publication Data
US 2020/0063908 A1    Feb. 27, 2020

Related U.S. Application Data

(60) Provisional application No. 62/465,490, filed on Mar. 1, 2017.

(51) Int. Cl.
*F16L 55/00* (2006.01)
*F16L 57/06* (2006.01)
*F16L 58/10* (2006.01)

(52) U.S. Cl.
CPC .......... *F16L 57/06* (2013.01); *F16L 58/1036* (2013.01); *F16L 58/1045* (2013.01)

(58) Field of Classification Search
CPC .... F16L 57/06; F16L 58/1036; F16L 58/1045
(Continued)

(56) References Cited

U.S. PATENT DOCUMENTS 1,601,093 A * 9/1926 Widmeyer .............. F16L 57/06
285/16
2,464,487 A * 3/1949 Chappell ................. F16L 58/00
285/55

(Continued)

FOREIGN PATENT DOCUMENTS

EP          1624273 A2    2/2006
WO    2008/100724 A1    8/2008

OTHER PUBLICATIONS

International Search Report issued in PCT/US2018/016095 dated May 7, 2018 (4 pages).

(Continued)

*Primary Examiner* — James F Hook
(74) *Attorney, Agent, or Firm* — Osha Bergman Watanabe & Burton LLP

(57) ABSTRACT

A system for transporting corrosive or erosive fluids having a flow conduit or flow equipment with a flow bore. One or more inserts (50) are disposed within the flow bore of the flow conduit or flow equipment. The insert(s) (50) include an internal structure (52) and an erosion or corrosion resistant coating (54) disposed around the internal structure. The insert(s) (50) is/are disposed inside the flow bore and provide erosion and/or corrosion resistance.

17 Claims, 4 Drawing Sheets

(58) Field of Classification Search
USPC .................................... 138/141, 146, 36, 42
See application file for complete search history.

(56) References Cited

U.S. PATENT DOCUMENTS

| | | | |
|---|---|---|---|
| 2,665,875 A | | 1/1954 | MacGregor |
| 2,974,684 A | * | 3/1961 | Ginaven ................. B04B 7/085 |
| | | | 285/148.23 |
| 2,986,847 A | | 6/1961 | Sato ....................... C23D 5/005 |
| | | | 264/269 |
| 3,006,381 A | | 10/1961 | Rothermel et al. |
| 3,087,645 A | | 4/1963 | Eddy et al. |
| 3,284,106 A | | 11/1966 | McIntosh et al. |
| 3,508,766 A | * | 4/1970 | Kessler ............... F16L 13/0263 |
| | | | 285/21.1 |
| 3,794,359 A | | 2/1974 | Fisher |
| 4,386,629 A | * | 6/1983 | Cook ...................... F16L 47/22 |
| | | | 138/103 |
| 4,532,957 A | * | 8/1985 | Battle ..................... F16K 3/316 |
| | | | 137/375 |
| 4,691,740 A | * | 9/1987 | Svetlik ................... B29C 49/26 |
| | | | 138/104 |
| 4,737,153 A | | 4/1988 | Shimamura et al. |
| 4,811,799 A | * | 3/1989 | Blackwell ............. E21B 21/015 |
| | | | 166/88.4 |
| 4,995,427 A | * | 2/1991 | Berchem ................ F16L 57/06 |
| | | | 138/DIG. 6 |
| 5,104,152 A | | 4/1992 | Galfant |
| 5,380,304 A | | 1/1995 | Parker |
| 5,406,871 A | * | 4/1995 | Lambert, Jr. ...... H02G 15/1826 |
| | | | 428/913 |
| 5,406,983 A | * | 4/1995 | Chambers ............. E21B 17/042 |
| | | | 138/109 |
| 5,837,083 A | | 11/1998 | Booth |
| 5,992,897 A | * | 11/1999 | Hill ....................... F16L 33/213 |
| | | | 285/55 |
| 6,125,890 A | | 10/2000 | Cooper et al. |
| 6,158,474 A | * | 12/2000 | Ishikawa ................ F16L 41/12 |
| | | | 138/109 |
| 6,540,918 B2 | * | 4/2003 | Gil .......................... B04C 5/185 |
| | | | 210/720 |
| 6,543,811 B1 | * | 4/2003 | Campbell ............... F16L 58/08 |
| | | | 285/16 |
| 2005/0082092 A1 | | 4/2005 | Hall et al. |
| 2005/0238461 A1 | | 10/2005 | Lutkus et al. |
| 2006/0054231 A1 | | 3/2006 | Wolfram et al. |
| 2009/0321181 A1 | | 12/2009 | Ballard, III |
| 2016/0168970 A1 | | 6/2016 | Kajaria et al. |
| 2016/0356413 A1 | | 12/2016 | Zhan |

OTHER PUBLICATIONS

Written Opinion issued in PCT/US2018/016095 dated May 7, 2018 (6 pages).
Office Action issued in U.S. Appl. No. 16/881,923, dated Feb. 3, 2022 (17 pages).
Office Action issued in U.S. Appl. No. 16/881,923, dated Aug. 4, 2022 (13 pages).

* cited by examiner

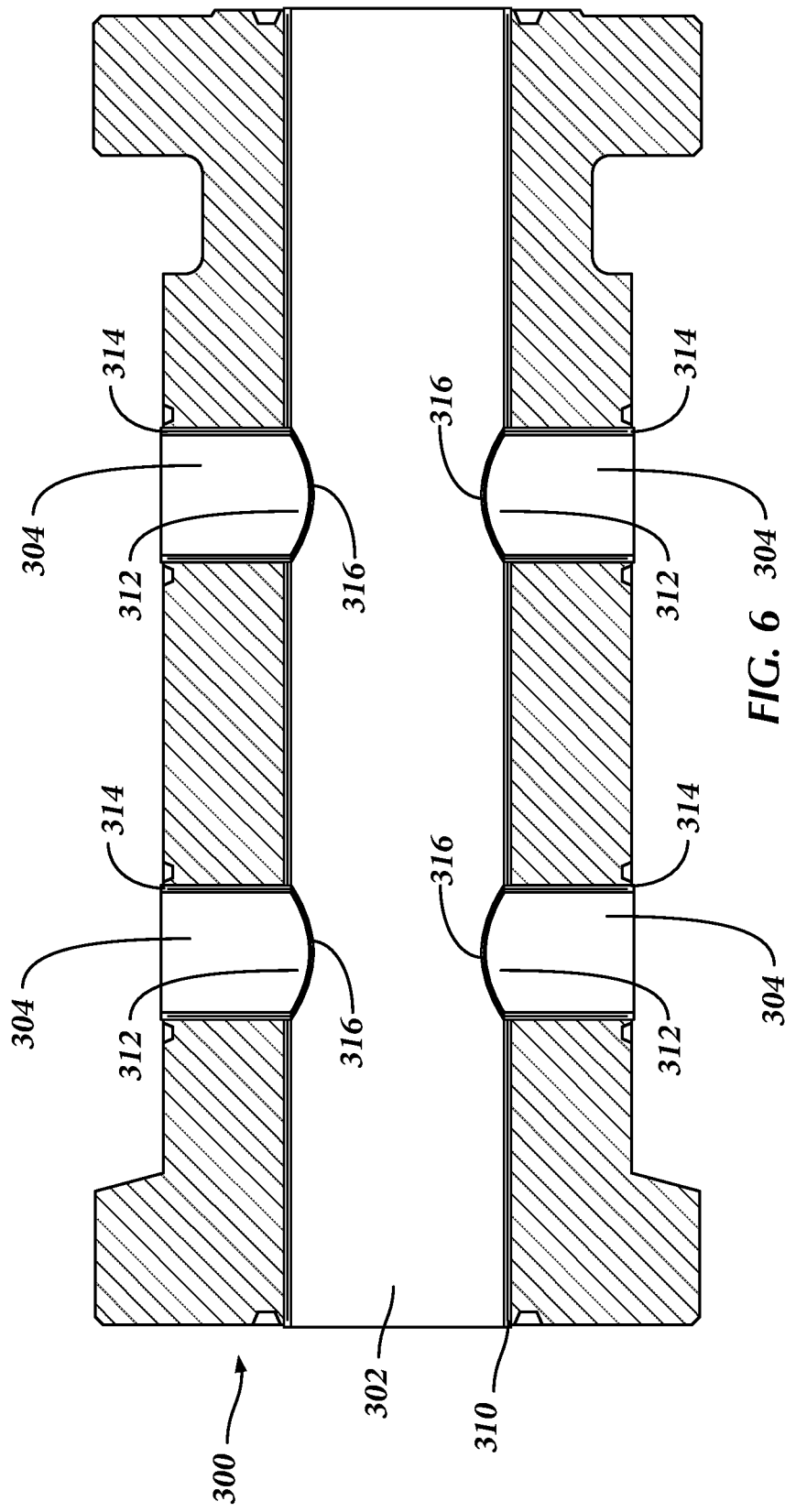

EROSION-RESISTANT INSERTS FOR FLOW EQUIPMENT

CROSS-REFERENCE TO RELATED APPLICATIONS

This application claims benefit, under 35 U.S.C. § 119, of U.S. Provisional Application Ser. No. 62/465,490 filed on Mar. 1, 2017 and entitled "Erosion-Resistant Inserts for Flow Equipment." The disclosure of this U.S. Provisional Application is incorporated herein by reference in its entirety.

BACKGROUND

US20160168970 describes a method for bonding a urethane layer to the equipment. In this method, a urethane nozzle is inserted into the equipment and a urethane coating is applied to the inside of the equipment. Various other methods have been proposed to spin cast, dip cast, or gravity cast piping or other flow components with polyurethane. These are difficult processes and it is difficult to bond the equipment and urethane correctly. Additionally, when the layer is damaged or worn, the entire pipe, valve, etc. must be replaced or taken out of service until the urethane can be replaced.

SUMMARY OF THE CLAIMED EMBODIMENTS

Embodiments disclosed herein are configured to provide the benefits of erosion resistant coatings, such as urethane, without the drawbacks of dealing with worn or damaged flow equipment.

In one aspect, embodiments disclosed herein relate to a system for transporting corrosive or erosive fluids having a flow conduit or flow equipment with a flow bore. One or more inserts are disposed within the flow bore of the flow conduit or flow equipment. The insert(s) include an internal structure and an erosion or corrosion resistant coating disposed around the internal structure. The insert(s) is/are disposed inside the flow bore and provide erosion and/or corrosion resistance.

In another embodiment disclosed herein is an insert for providing corrosion and erosion resistance to flow equipment having an internal structural component and a polyurethane coating disposed around the internal structural component. The insert includes at least a lip, a tapered section, and a tab mechanically engaging the flow conduit, flow equipment or flow bore and used to align or restrain movement of the insert. The insert also has a section that forms a seal along one or more respective interfaces formed between the insert and a respective portion of a second insert. The insert also has an end section that forms a dynamic seal with a moving component on flow equipment.

Other aspects and advantages will be apparent from the following description and the appended claims.

BRIEF DESCRIPTION OF DRAWINGS

FIG. 6 is an illustration of a goat head including inserts according to embodiments disclosed herein.

DETAILED DESCRIPTION

Figure 1:
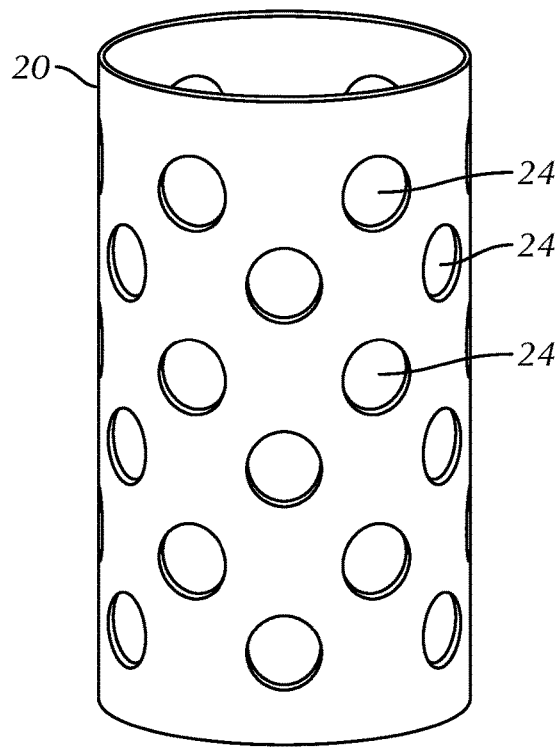
FIGS. 1 and 1A are an illustration of an internal structure of an insert according to embodiments disclosed herein.

In one aspect, embodiments herein relate to an erosion-resistant insert that significantly decreases the erosion that may occur in flow lines and flow equipment, such as those used in fracing and flowback operations. Examples of such equipment include, but are not limited to, pipes, joints, swivels, manifolds, frac heads, valves, etc. By using the erosion-resistant inserts, the life of the flow lines and equipment may be extended, which is beneficial to many types of operation models, especially those in sand-laden slurry operations or other systems that may encounter erosive fluid mixtures.

Erosion-resistant inserts according to embodiments herein include structures having an erosion resistant coating designed to fit inside a flow bore. The coated inserts include an internal structure that provides support for the erosion resistant coating during the manufacturing process, installation within flow equipment, and use. The erosion resistant coating may be formed, for example, from a urethane resin or other types of resins or pre-polymer mixtures (epoxy, urea, etc.) that may be coated, cured, and shaped around the internal structure.

Erosion-resistant inserts disclosed herein may be designed (shape, thickness, etc.) based on the flow line or equipment within which it is to be positioned. For pipes and other equipment having cylindrical flow bores, the insert may also be generally cylindrical in shape and designed to fit within the pipes and equipment; other shapes, such as square pipe or others known in the art are also contemplated. The internal structure of the insert may be sized with knowledge of the flow line or equipment, and the insert may then be coated with urethane cured to a desired thickness.

The inserts may be provided with one or more tapered ends that aid in fitting the insert in the equipment. Additionally, the inserts may be provided with one or more cut outs or joint sections to facilitate more complex equipment geometries such as angles, tees, and intersections. Further, the inserts may be provided with one or more portions or ends designed to facilitate joining inserts together, such as overlapping ends to accommodate complex geometries or unsupported ends to facilitate an interference fit to effectively seal the interface. Such joints will be described in more detail below.

In some embodiments, such as for pipe joints, the inserts may be long in comparison with diameter. This may allow for the use of fewer total inserts for a given equipment structure. Additionally, through the use of cut outs and joint sections, inserts may be designed in several standard sizes and arrangements, thus reducing the total number of different inserts that may need to be produced and reducing complexity of the manufacturing process.

Erosion-resistant inserts disclosed herein may be manufactured, as noted above, with an internal structure and an erosion-resistant coating, such as a polymeric (polyurethane) material. Both the internal structure and erosion-resistant coating material will be described below in more detail. The arrangement of the internal structure and coating may provide for increased rigidity and integrity of the inserts compared to conventional spray-in inserts. Additionally, the increased integrity provided by the internal structure may be beneficial when removing the insert for maintenance or replacement.

The inserts according to one or more embodiments disclosed herein may be manufactured to fit any type of flow lines and equipment, including valves, pup joints, adapter hubs, tees, frac heads, valves etc., provided the internal geometry of the flow bore is known. With knowledge of the internal geometry, the insert structure can be created so that it fits inside the flow line/equipment with a particular tolerance and gap to accommodate the urethane coating. Specific equipment geometries, which will be described below.

Generally, the purpose of the internal structure is to provide a supporting structure on which an erosion-resistant material, such as a urethane, can be disposed. In certain embodiments, the supporting structure may be cylindrical in shape with one or more openings that can be filled with erosion-resistant material to better secure the erosion-resistant material to the structure. The supporting structure also provides rigidity to the completed insert so that it maintains its shape during installation and use, and limits the expansion/contraction of the insert material due to environmental conditions.

The internal structure can be made of any material that can withstand the coating process and provides sufficient resilience to provide an initial sealing force between the erosion-resistant coating and the flow bore of the flow line/equipment. Example materials include perforated metal, wire mesh, and glass-coated nylon, among others.

An example of a completed internal structure is illustrated in FIG. 1. As illustrated in FIG. 1, the example internal structure 20 may be an elongated structure with a plurality of openings therethrough. In the embodiment shown, the internal structure 20 comprises a tubular steel element and the plurality of openings are in the form of circular perforations 24. It should be appreciated that the openings through the internal structure 20 are not limited to the shape, number, size, and orientation of the perforations 24 shown in FIG. 1.

Once the internal structure is formed, an erosion-resistant coating can be applied to the structure. The perforations 24 provide openings that can be filled with the erosion-resistant coating material, such as urethane resin, to better secure the erosion-resistant coating to the structure 20. For example, the internal structure may be coated by dipping the internal structure into a urethane resin until the desired amount of urethane is applied. Other methods to coat the internal structure may include casting, injection molding or compression molding.

Figure 1A:
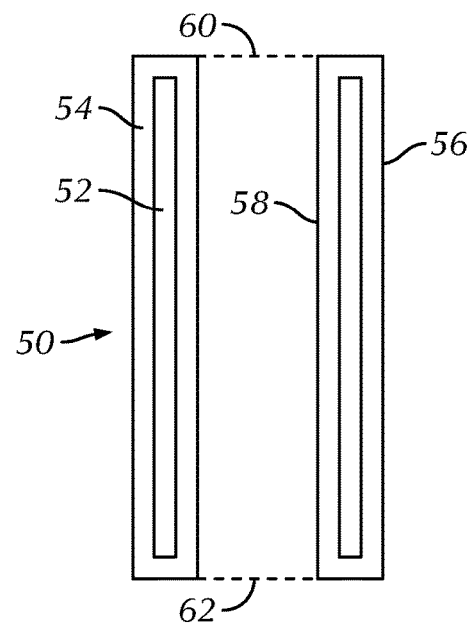

A cross-section of a resulting cylindrical insert structure 50 is illustrated in FIG. 1A. Insert 50 includes an internal support structure 52, which may be similar to the structure 20 of FIG. 1, coated with an erosion-resistant coating 54, such as a polyurethane. While illustrated as a simple cylinder, various shapes and configurations may be made, for example, by shaping the internal support or the erosion-resistant coating, as described below. The resulting structure has an outer surface 56 that may engage with the flow bore of the flow equipment (not illustrated), an internal surface 58 providing a flow bore through the insert, and ends 60, 62 that may engage or overlap various portions of the flow equipment, abutting flow equipment, or other inserts to provide desired (complete or substantially complete) coverage of the internal surface of the flow equipment.

The erosion-resistant material used to form the coating on the internal structure may be, for instance, formed from any resin known in the art to provide corrosion and/or erosion resistance. Example coatings include resin systems used in forming epoxies, polyurethanes, and polyureas, among others. Additionally, different urethane types may be used, including resins of esters, ethers, ester-poly blends that provide the desired sealing characteristics. Additionally, additives may be provided with the urethane material to increase resilience, hardness, increase longevity, provide different surface characteristics, grip with the equipment, etc. Such additives may include various ceramics, ceramic beads, silicon based particles, sand, or other additives that enhance the desired properties.

The internal structure and/or coating can also include one or more mechanical engagement features that may be used to secure or align the insert within the flow line/equipment. In one or more embodiments, mechanical engagement feature may include a lip, a tapered end, or other features on one of the ends of the internal structure that is sized to engage with a seal pocket of the flow line/equipment.

Figure 2:
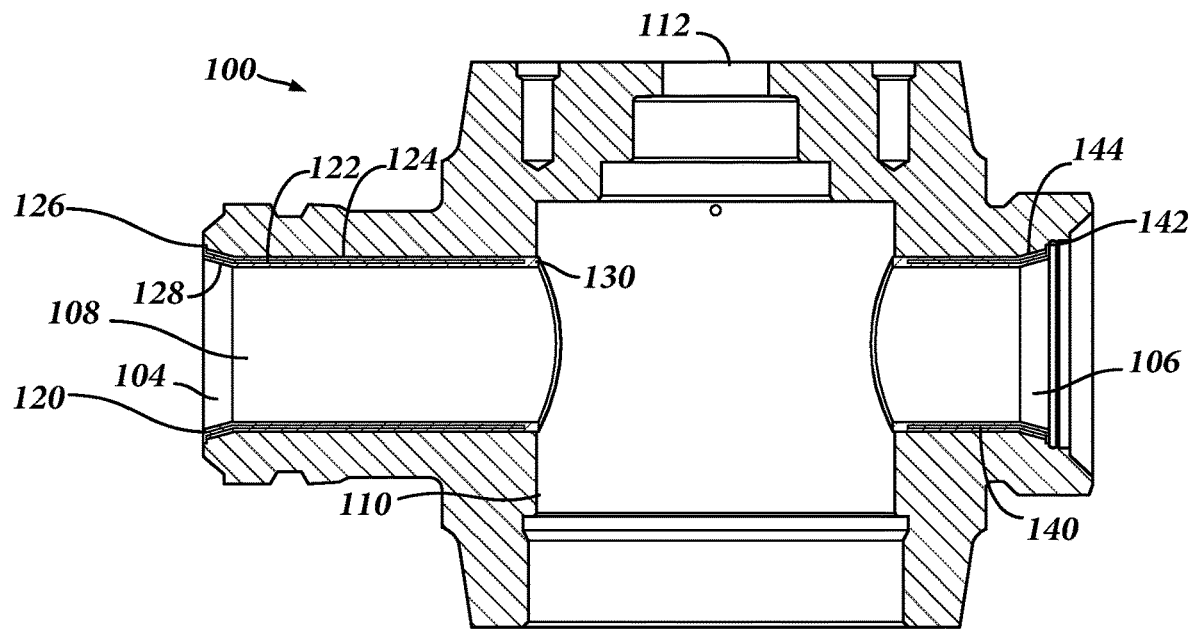
FIG. 2 is an illustration of a plug valve including an insert according to embodiments disclosed herein.

Referring now to FIG. 2, a plug valve 100 including inserts according to embodiments herein is illustrated. Plug valves may be symmetric (having similar ends), or asymmetric, as illustrated, including a valve body 102 having an end 104 and an end 106 that are configured as "male" or "female" ends to facilitate connection to pipes or other equipment (not illustrated) in a desired manner. The plug valve 100 may include an internal flow bore 108 separated by a plug 110 operated by stem 112. The plug valve includes packing, seals, and other parts as known in the art, but not described here.

Disposed in end 104 is an insert 120 according to embodiments herein. The insert includes an internal support structure 122 coated with a polyurethane or another erosion-resistant coating 124. The polyurethane coated structure 120 may include a lip 126 and a tapered section 128 that may provide mechanical engagement with the equipment structure. This mechanical engagement may function to laterally secure the insert within the flow line/equipment. For example, the lip 126 may abut a portion of downstream pipe, when connected, and the lip 126 and tapered section 128 may provide support, each securing the insert in place within the bore 108 of the plug valve 100.

Insert 120 may also include an unsupported end 130, the internal structure 124 not extending fully to the end of the portion of the insert that abuts plug 110. This portion of the insert may effectively abut and/or seal against the plug, providing a surface that protects the valve body against erosion up to the plug.

A similar insert 140 may be disposed in end 106. End 106 may be adapted to receive a male connector, extending partially into end 106. Insert 140 may thus include a lip 142 and taper 144 that are designed to be fit within the valve, accounting for the different type of connection and allowing the insert to be secured in place once connected and prevent lateral movement. In some embodiments, the support structure and/or erosion-resistant coating may have some degree of flexibility, allowing the lip to be compressed slightly during insertion and "snapped" into place within a pocket of formed in the valve body.

Figure 3:
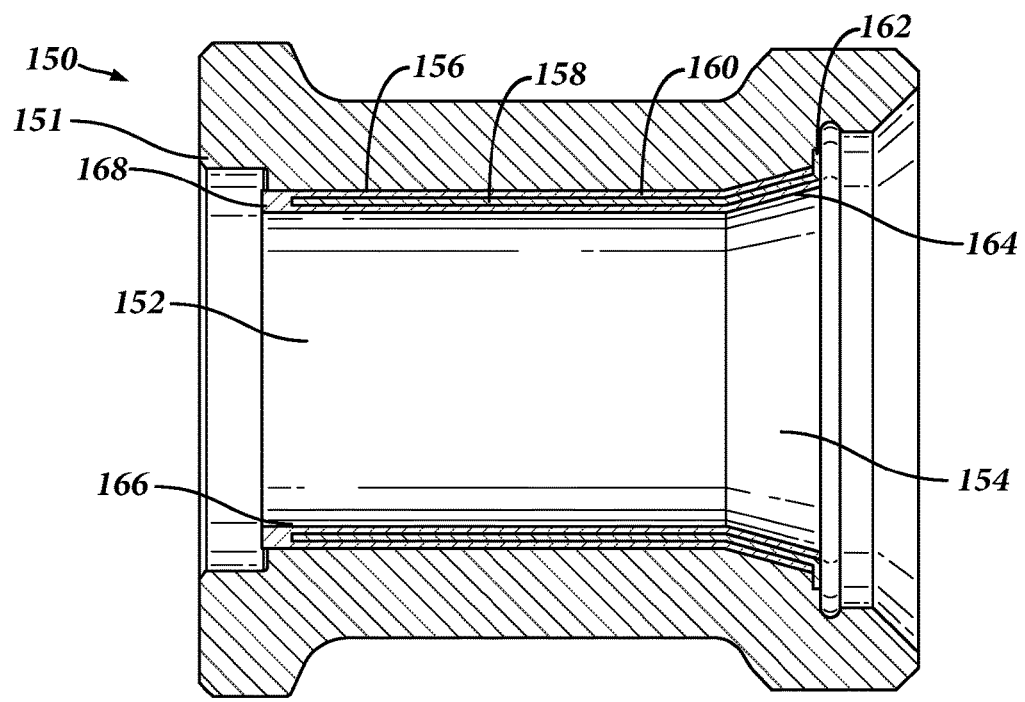
FIG. 3 is an illustration of an adapter hub including an insert according to embodiments disclosed herein.

Referring now to FIG. 3, an adapter hub 150 including an insert according to embodiments herein is illustrated. Adapter hub 150 may include body 151 and two female ends 152, 154 adapted to receive male connectors that may be partially inserted into and abut at least a portion of the insert 156. Insert 156 may be similar to the inserts described with respect to FIG. 2, and may include internal structure 158, insert material (erosion-resistant coating) 160, lip 162, taper 164, bore 166, and unstructured end 168. While illustrated as an adapter hub including two female ends, inserts may be designed for adapter hubs and other components herein having two male ends or one male end and one female end.

The tapered ends, tabs, and/or lips of the inserts may be formed in many different ways. For example, the taper may be generated when the internal structure is formed. The tapered end or lip may also be provided by modifying the internal structure after it is formed. Alternatively, the tapered end and/or lip may be formed by the coating, either during the coating or molding process, or after the coating or molding process by removing material necessary to faun the tapered end, lip, or other desired structure.

FIGS. 2 and 3 were directed toward flow equipment that may include only one tapered end or may have been relatively short in length. Inserts according to embodiments herein may be designed, shaped, and configured for insertion into more complex or longer flow equipment bores, as illustrated and described with respect to FIGS. 5-8. Such flow equipment may be protected from erosion by use of two or more inserts.

Figure 4:
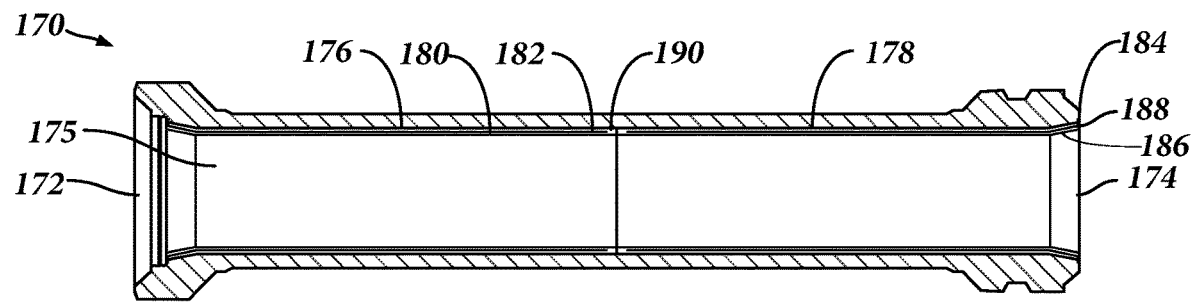
FIG. 4 is an illustration of a pup joint including an insert according to embodiments disclosed herein.

FIG. 4 illustrates a pup joint 170 including erosion-resistant inserts according to embodiments herein. As the pup joint 170 includes two tapered ends 172, 174, full coverage of the pup joint flow bore 175 may be provided by use of two inserts 176, 178, inserted in the respective ends. Inserts 176, 178 may be formed from an internal structure 180 and coating 182, and may each include a lip 184, taper 186, bore 188, and ends 190. The ends 172, 174 of the pup joint bore are protected in a manner similar to that described above with respect to FIGS. 2 and 3.

What is undesired, however, is a gap in coverage in the middle of the pup joint. Inserts according to embodiments herein may be designed so as to abut or overlap, with no or minimal clearance, providing an effective seal between the inserts, eliminating or minimizing contact of erosive material with the bore of the pup joint. As illustrated in FIG. 4, ends 190 of the inserts include an unsupported (no internal structure) section of coating 182. When the inserts are axially secured, the unsupported ends may be forced together in an interference fit that effectively seals the interface. In other embodiments, the unsupported portions of the coating may abut, overlap, or include geometry (interlocking portions, such as a tab and insert or others) or complementary features that create a seal between the ends of the inserts so that pressurized fluid is contained within the flow bore of the insert.

It is also contemplated to utilize a sealant, such as a low temperature curing resin, that may cure upon seating of the two ends 190. In such embodiments, the sealant or resin used may form a relatively low strength bond between the two ends 190, sealing the interface while not significantly hampering efforts to remove the inserts when replacement is needed.

Use of multiple inserts may be necessary due to the length or configuration of the flow conduit in which the insert is desired to be disposed. When possible, it may be desired to have both inserts be of similar configuration. Producing identical parts may reduce the cost of the individual inserts and would make field installation simpler, as there may be no need to determine which piece goes in which end of the pup joint, for example.

Figure 5:
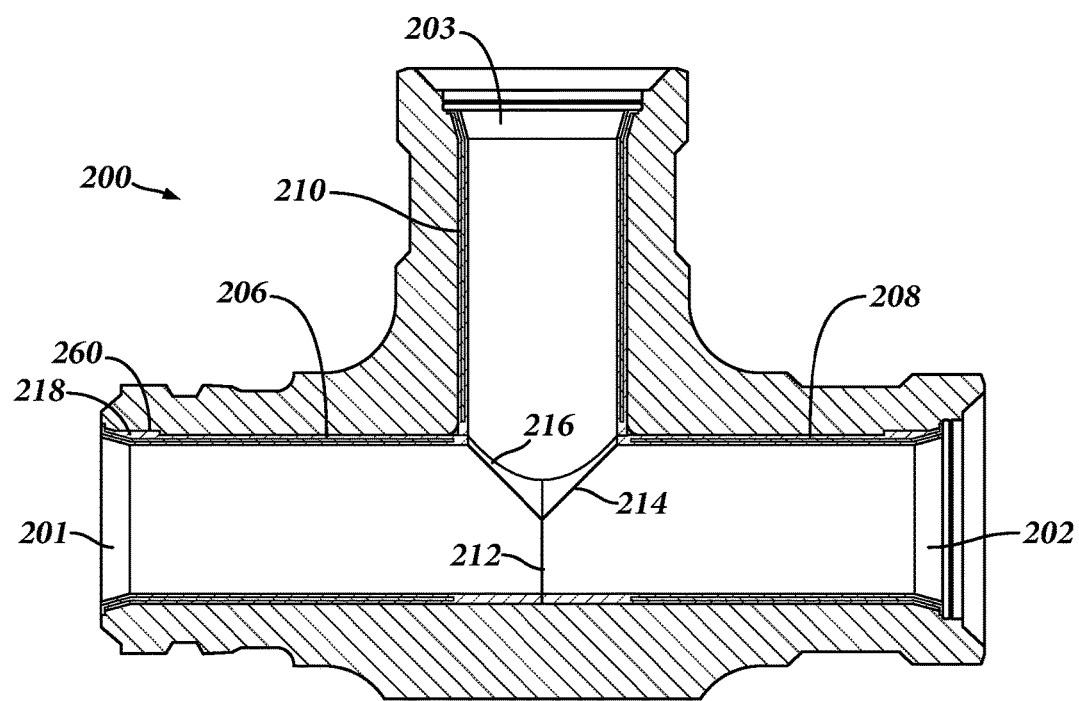
FIG. 5 is an illustration of tee including inserts according to embodiments disclosed herein.

In one or more embodiments, the equipment or flow conduit may have a significantly more complex structure, such as a tee or a goat head as illustrated in FIGS. 5 and 6.

Referring to the tee illustrated in FIG. 5, tee 200 may include three flow bores 201, 202, and 203. Each flow bore may terminate at a male or female connection, for example, and may include tapering, similar to the flow equipment as described above with respect to FIGS. 2-4. Protection of the flow bores of the tee may be provided by three inserts 206, 208, 210. The inserts may include tapers, lips and bores, similar to other embodiments. The interfaces 212, 214, and 216 between the respective inserts is designed to provide a seal between the insert ends, which may be achieved similar to that as described above by using an interference fit, overlaps, or other features to prevent or minimize contact of erosive fluid with the tee body proximate the interfaces.

Additional mechanical engagement feature (not illustrated) may also be included on one or more of the inserts, such as a molded radial extension 218 in the urethane coating, as illustrated in inserts 208, 210. The radial extension 218 may engage a machined groove 260 in the flow equipment, and may function to rotationally align the inserts within the flow equipment. This may be useful where there is a feature elsewhere along the insert that must rotationally align with a complementary feature in the flow equipment, such as a side bore in a tee branch (illustrated as bore 201) and/or an insert in such a side bore (illustrated as insert 206). The molded radial extension 218 may be produced similar to the tapered ends. That is, the molded radial extension may be formed in the internal structure or by modifying the internal structure after it is formed. Additionally, the molded radial extension may be made from the erosion-resistant coating either during the application or molding process, or after application by physically manipulating the coating material.

As noted above, when multiple inserts may be used in the same flow conduit or equipment, such as where bi-directional flow is possible or the geometry is too complicated to create a single insert, the interface between the inserts must be sealed to prevent particulates and/or acid (when inserts are used for corrosion protection) from contacting the metal structure of the flow conduit or equipment. In such embodiments, the inserts may be slightly oversized, with the oversized portion at least partially consisting of an unsupported urethane section. When two such inserts are placed next to each other and the inserts are axially secured, the unsupported ends may be forced together in an interference fit that effectively seals the interface. In other embodiments, the unsupported urethane portions may abut, overlap, or include some other sort of geometry that creates a seal between the ends of the inserts so that pressurized fluid is contained within the flow bore of the inserts.

In one or more embodiments, such as illustrated in FIG. 2, the insert may abut a ball or plug of a valve, or other equipment with a rotating or sliding part. In such embodiments, the insert may need to be designed with a very tight tolerance. A tapered end, either supported or unsupported, may be required to completely seal the end of the insert against the valve or other equipment. Such an arrangement may be necessary to prevent liquids or gases, in some cases acidic, from contacting the equipment or pipe wall and causing undue corrosion. The design should be such that there is a dynamic seal formed between the insert and the rotating or sliding part, where the seal surface has enough resistance to flow that solids traversing through the valve may not migrate between the insert and the ball or plug, as such would cause undesired erosion.

Illustrated in FIG. 6 is another example of a more complex structure, a goat head or other type of injection block including multiple inlet and/or outlet bores, that may include protective inserts according to embodiments herein. As illustrated, goat head 300 may include a primary bore 302 and four side bores 304. To provide corrosion resistance to such a structure using inserts according to embodiments herein, a main insert 310 may be provided having four cut-outs (gaps in structure) 312 configured to align with each of the side bores 304. Each of the side bores 304 may contain an insert 314 disposed within the bores. The side bores may be of the same or different bore size, and may include the same or different end configurations, and as such the inserts may be the same or different, as required for the structure of interest.

The side bores 304 and main insert 310 may have complementary sections for sealing the flow bore and protecting the internal surfaces of the goat head. The complementary surfaces, as described earlier, may be provided at interfaces formed when the interior end 316 of the side bore inserts abuts or engages main insert 310 proximate gap 312. The complementary surfaces may be designed to provide a seal between the inserts 310, 314, and may be achieved by using an interference fit, overlaps, or other features to prevent or minimize contact of erosive fluid with the tee body proximate the interfaces.

Figure 7:
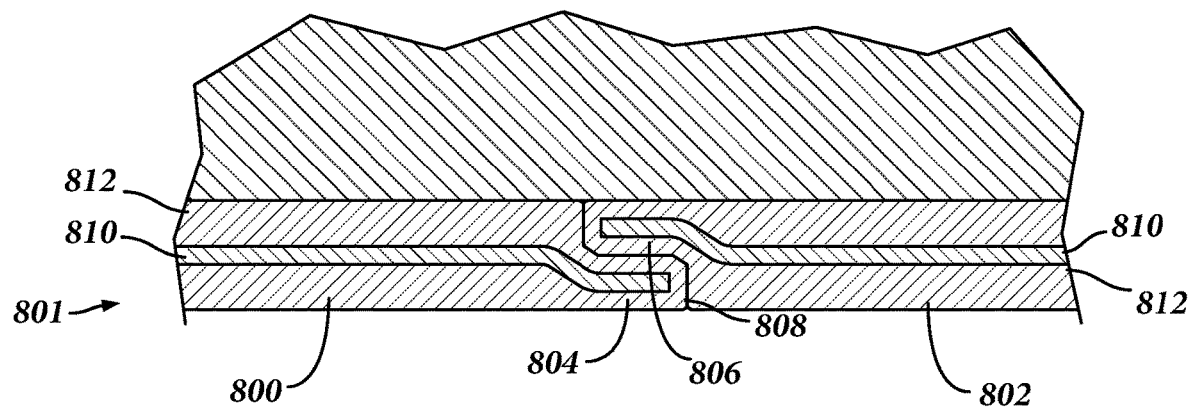
FIG. 7 is an illustration of a feature of an insert according to embodiments disclosed herein.

An example of such complementary sections is illustrated in FIG. 7, illustrated for a straight section of pipe 801. As illustrated in FIG. 7, inserts 800 and 802 may have complimentary overlapping sections 804 and 806, forming a sealing interface 808. Each insert 800, 802 may include an internal support structure 810 surrounded by an erosion-resistant coating 812. The internal structures, rather than being straight, may be complementary in shape, facilitating the overlap and seal, and providing structural support for the overlapped sections 804, 806, such that the inserts may be retained in position and effectively seal when fluid is passed over the surface of the inserts. Although the shape of the internal support 810 varies between inserts 800, 802, the overall shape of the inserts 800, 802 may be such that the internal diameter of the insert is consistent, providing a uniform diameter of the flow bore over the length of the combined inserts. Inserts having similar complimentary end or interface sections may be used for tees, having 90 degree bends, or other structures that may include bends of a different angle. Tortured, close fitting paths are expected to provide a better seal than straight interfaces.

The insert structures may thus be designed so that the one or more inserts completely seal the insert against the pipe or other equipment. Such an arrangement may be necessary to prevent erosive and/or corrosive liquids or gases from contacting the equipment or pipe wall and causing undue corrosion. This may be accomplished by providing a complementary geometry such as the one illustrated in FIG. 7 or other geometries such as wedges, circular arches, and triangular sections. In one or more embodiments, multiple repeated geometries may be provided, one on top of the other, to create multiple redundant seals to further aid in protection of the pipe or equipment. In addition, by overlapping the internal structures, the entire length of the coating is supported, which is beneficial in larger bore applications where the tendency of the coating, such as a polyurethane, to contract could cause unsupported sections to buckle inward and compromise the seal.

Without modification, the thickness of the insert may reduce the flow bore size in an undesirable way for some applications. In such embodiments, the flow bore of the conduit or equipment may be machined slightly larger than is normal, to accommodate the insert. This is generally possible with typical flow conduit and equipment used in corrosive or erosive service, which are manufactured to provide a wear cushion. Oversizing the flow bores to accommodate the inserts may be accomplished by reducing or eliminating the typical wear cushion.

Although not depicted, one or more intermediate inserts may be used between "end" type inserts, such as for the pup joint shown in FIG. 4, for example. These intermediate inserts may include, for instance, straight internal structures with unsupported urethane sections, or some other sealing feature, on both ends for sealing to adjacent inserts. This may be useful, for instance, in long pup joints, where standard-sized "end" type inserts are used and the distance between the "end" type inserts is spanned by one or more intermediate inserts of known length, such as 1 ft, 2 ft, 3 ft, etc. This may limit the number of insert sizes and configurations that must be produced, further reducing the price of a given insert.

As described above, embodiments disclosed herein are directed toward inserts. The inserts significantly decrease the erosion that occurs in flow lines and equipment used in fracing and flowback. By using the inserts, the life of the flow lines and equipment can be extended. In some embodiments, the internal structure and/or the resin coating may also include one or more mechanical engagement features that secure or align the insert within the flow line/equipment. This mechanical engagement may function to laterally secure the insert within the flow line/equipment. Further, embodiments of the inserts may include features that may abut, overlap, or include some other sort of geometry that creates a seal between the ends of the inserts so that pressurized fluid is contained within the flow bore of the inserts, advantageously allowing for use of the inserts with flow lines and equipment with multi-directional flow and/or multiple inlets and outlets.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A system for transporting corrosive or erosive fluids, the system comprising:
   a flow conduit or flow equipment comprising at least two flow bores perpendicular to each other;
   an insert disposed within each flow bore of the at least two flow bores, each insert comprising:
   an internal structure; and
   an erosion or corrosion resistant coating disposed around the internal structure,
   wherein the internal structure axially extends from a first end surface at a first end of the insert to a distance away from a second end surface at a second end of the insert to form an unsupported end without the internal structure at the second end;
   wherein each insert is disposed inside each flow bore of the at least two flow bores and provides erosion and/or corrosion resistance,
   wherein the internal structure is entirely within each flow bore of the at least two flow bores.

2. The system of claim 1, wherein the internal structure comprises a perforated metal, wire mesh, or glass coated nylon.

3. The system of claim 1, wherein the erosion or corrosion resistant coating comprises a polymeric or rubber coating.

4. The system of claim 3, wherein the polymeric or rubber coating comprises a polyurethane, an epoxy, or a polyurea.

5. The system of claim 1, wherein the first end of each insert further comprise at least one of a lip, a tapered section, and a tab configured to mechanically engage the flow conduit, flow equipment or flow bore and align or restrain movement of the insert.

6. The system of claim 1, wherein each insert further comprises a mechanical engagement, configured to fit into a corresponding feature of the flow conduit or flow equipment and to hold each insert in place during operation.

7. The system of claim 1, comprising two or more inserts, wherein the inserts are configured to form a seal along one or more respective interfaces formed between the inserts.

8. The system of claim 7, wherein the two or more inserts comprise complementary overlapping structures.

9. The system of claim 7, wherein the flow equipment comprises a pup joint, a tee, a cross, or a y-splitter.

10. The system of claim 7, wherein the flow equipment comprises a manifold comprising multiple inlets and/or multiple outlets and/or a primary flow channel.

11. The system of claim 1, wherein the flow equipment comprises a valve, the valve including an inlet flow bore, an outlet flow bore, and a flow control member, wherein the system includes an insert disposed in each of the inlet flow bore and the outlet flow bore, and wherein the inserts are configured to form a dynamic seal with the flow control member.

12. An insert for providing corrosion and erosion resistance to flow equipment, the insert comprising:
an internal structural component that is sized to fit entirely within a flow bore of the flow equipment; and
an erosion-resistant coating disposed around the internal structural component,
wherein the internal structure axially extends from a first end surface at a first end of the insert to a distance away from a second end surface at a second end of the insert to form an unsupported end without the internal structure at the second end, and
wherein the unsupported end comprises a section configured to form a seal along one or more respective interfaces formed between the insert and a respective portion of a second complementary insert perpendicular to the insert.

13. The insert of claim 12, wherein the first end of the insert comprises at least one of a lip, a tapered section, and a tab configured to mechanically engage the flow conduit, flow equipment or flow bore and align or restrain movement of the insert.

14. The insert of claim 12, wherein the insert comprises an end section configured to form a dynamic seal with a moving component of a flow equipment.

15. The insert of claim 12, further comprising a mechanical engagement configured to fit into a corresponding feature of the flow equipment and to hold the insert in place during operation.

16. The insert of claim 12, wherein the internal structural component comprises:
an elongated tubular element that defines an axial bore which is open at both ends of the tubular element; and
a plurality of opening through the side of the elongated tubular element.

17. The insert of claim 16, wherein the erosion-resistant coating is disposed within at least one of the plurality of openings through the side of the tubular element.

* * * * *